UNITED STATES PATENT OFFICE.

SUE C. HAMILTON, OF ANN ARBOR, MICHIGAN.

COMPOSITION OF MATTER FOR WHIPPING CREAM.

1,181,220.  Specification of Letters Patent.  Patented May 2, 1916.

No Drawing.   Application filed April 16, 1915.   Serial No. 21,647.

*To all whom it may concern:*

Be it known that I, SUE C. HAMILTON, a citizen of the United States, residing at 924 Forest avenue, city of Ann Arbor, county of Washtenaw, State of Michigan, have invented a new and useful Composition of Matter for Whipping Cream, of which the following is a specification.

My composition consists of the following ingredients, combined in the proportions stated, viz:—

| | | |
|---|---|---|
| Calcium oxid | 1 | part. |
| Sugar | 2½ | " |
| Water | 8 | " |
| Magnesium sulfate | 1/960 | " |

These ingredients are to be thoroughly mingled by agitation, let settle and siphoned off.

Add one-half teaspoon of my composition of matter to one cup of 20% cream and whip as usual.

I am aware that a composition consisting of calcium oxid, sugar and water has been used for the same purpose, but I am not aware that all the ingredients of my composition have been used. Nowhere have I found any case of the addition of magnesium sulfate to the composition called calcium sucrate, for whipping cream. I know that some amount of magnesium is absorbed from the calcium used in combination with cane sugar. By my own experiments, here, for the past three years, I have discovered that, of the various waters which I have used, those waters which have analyzed as containing the largest percentage of magnesium are by far the most satisfactory. Following this finding up, I have discovered that the addition of 1/48 of 1% $MgSO_4$ to the water in which the sugar is dissolved and to which the "cream of lime" is added, gives me an article superior, for the whipping of cream, to the ordinary calcium sucrate. On this finding I base my claim for a patent.

I claim:

The herein described composition of matter for whipping cream consisting of

| | | |
|---|---|---|
| Calcium oxid | 1 | part. |
| Sugar | 2½ | " |
| Water | 8 | " |
| Magnesium sulfate | 1/960 | " | substantially as above described.

SUE C. HAMILTON.

Witnesses:
 LEOLA GREEN,
 ARTHUR BROWN.